United States Patent
Chen et al.

(10) Patent No.: US 12,507,387 B2
(45) Date of Patent: Dec. 23, 2025

(54) ELECTRONIC DEVICE

(71) Applicant: PEGATRON CORPORATION, Taipei (TW)

(72) Inventors: Chun-Chih Chen, Taipei (TW); Chien-Yi Wu, Taipei (TW); Wei-Chieh Chin, Taipei (TW); Cheng-Yu Wei, Taipei (TW); Chia-Ho Ting, Taipei (TW); Huan-Li Chu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 187 days.

(21) Appl. No.: 18/483,853

(22) Filed: Oct. 10, 2023

(65) Prior Publication Data
US 2024/0224482 A1 Jul. 4, 2024

(30) Foreign Application Priority Data
Dec. 30, 2022 (TW) .................................. 111150914

(51) Int. Cl.
*H05K 9/00* (2006.01)
*G06F 1/3231* (2019.01)
*H04B 1/3827* (2015.01)

(52) U.S. Cl.
CPC ......... *H05K 9/0071* (2013.01); *G06F 1/3231* (2013.01); *H04B 1/3838* (2013.01); *H05K 9/006* (2013.01)

(58) Field of Classification Search
CPC .... H05K 9/0071; H05K 9/006; G06F 1/3231; H04B 1/3838

USPC .......................................................... 340/999
See application file for complete search history.

(56) References Cited

U.S. PATENT DOCUMENTS

| | | | | |
|---|---|---|---|---|
| 2016/0056581 | A1* | 2/2016 | Kamikura | H01R 13/6485 439/76.1 |
| 2018/0151539 | A1* | 5/2018 | Nakamura | H10K 59/18 |
| 2019/0226915 | A1* | 7/2019 | Zhang | G01J 5/025 |
| 2023/0307857 | A1* | 9/2023 | Liao | H01R 13/502 |

FOREIGN PATENT DOCUMENTS

| | | |
|---|---|---|
| CN | 111586824 A | 8/2020 |
| CN | 211906272 U | 11/2020 |

* cited by examiner

*Primary Examiner* — Kerri L Mcnally
(74) *Attorney, Agent, or Firm* — Muncy, Geissler, Olds & Lowe, P.C.

(57) ABSTRACT

The present invention discloses an electronic device. The electronic device includes a connector and a sensing control unit. The connector includes a metal mask and at least one terminal. The sensing control unit is electrically connected to the metal mask and the at least one terminal. The sensing control unit is suitable for sensing whether the connector is connected to an external device, and includes a proximity sensing circuit connected to the metal mask. When the connector is connected to the external device, the sensing control unit enables the metal mask to be grounded. When the connector is not connected to the external device, the sensing control unit enables the metal mask to be floated, and the floated metal mask is suitable as a sensing electrode of the proximity sensing circuit.

10 Claims, 4 Drawing Sheets

ELECTRONIC DEVICE

CROSS REFERENCE TO RELATED APPLICATIONS

This application claims the priority benefit of Taiwan application serial no. 111150914, filed on Dec. 30, 2022. The entirety of the above-mentioned patent application is hereby incorporated by reference herein and made a part of this specification.

BACKGROUND

Technical Field

The present invention relates to an electronic device, in particular to an electronic device conforming to a Specific Absorption Rate (SAR) of electromagnetic wave energy.

Description of Related Art

The Federal Communications Commission (FCC) of the United States, the Conformite Europeenne (CE) certification of the European Union, and other countries or regions all specify the amount of absorbable radiation power when users use wireless electronic devices. This amount of absorbable radiation power is referred to as an SAR of electromagnetic wave energy. A lower SAR value indicates a smaller amount of radiation absorbed. However, an electronic device does not always approach a human body when used. Therefore, in order to balance the performance and SAR value of a wireless power, the existing method is to detect whether the human body approaches the device through a proximity sensor. When the human body approaches the device, the radiation power may be controlled to meet the requirements of the SAR value.

In general, a sensing electrode of the proximity sensor is disposed nearby an antenna of the electronic device to detect any human body approaching the antenna. Once it is detected that the human body is approaching, the wireless power of the electronic device is reduced within a power limit range specified by the SAR.

The sensing electrode is disposed in three manners currently. In the first manner, the sensing electrode is disposed nearby the antenna (for example, on a left side and a right side). However, because the electronic device is thinner and other elements (such as a camera, a Universal Serial Bus (USB) socket, and a microphone socket) are often required nearby the antenna, space for placing the sensing electrode is quite limited. In the second manner, the sensing electrode is disposed underneath the antenna. However, in the electronic device with a relatively small thickness, the sensing electrode will quite approach the antenna, which will affect the gain performance of the antenna. In the third manner, the sensing electrode is integrated in the antenna pattern. However, because a new wireless technology requires a wider bandwidth, this manner will bring greater and more complex challenges to the antenna design.

SUMMARY

An object of the present invention is to provide a sensing electrode setting manner which can solve the problem of insufficient setting space or influence on antenna performance. A sensing electrode for detecting whether a human body approaches is integrated into a connector of an electronic device.

In order to achieve the foregoing object, the present invention provides an electronic device, including a connector and a sensing control unit. The connector includes a metal mask and at least one terminal. The sensing control unit is electrically connected to the metal mask and the at least one terminal. The sensing control unit is suitable for sensing whether the connector is connected to an external device, and includes a proximity sensing circuit connected to the metal mask. When the connector is connected to the external device, the sensing control unit enables the metal mask to be grounded. When the connector is not connected to the external device, the sensing control unit enables the metal mask to be floated, and the floated metal mask is suitable as a sensing electrode of the proximity sensing circuit.

In an embodiment, the connector is a USB Type-A, Type-B, or Type-C connector.

In an embodiment, the electronic device further includes a Radio Frequency (RF) unit. The RF unit is electrically connected to the sensing control unit. The proximity sensing circuit detects a proximity state of an object via the floated metal mask. The sensing control unit adjusts an output power of the RF unit according to the proximity state.

In an embodiment, when the proximity sensing circuit detects proximity of the object via the floated metal mask, the sensing control unit controls the output power of the RF unit to be reduced to a threshold.

In an embodiment, the sensing control unit further includes a sensor hub. The sensor hub is electrically connected to the terminal, and the sensor hub detects, through the terminal, whether the connector is connected to the external device.

In an embodiment, the sensing control unit further includes a switching element. The switching element is electrically connected to the sensor hub and the metal mask. When the connector is connected to the external device, the sensor hub controls the switching element to switch to enable the metal mask to be grounded. When the connector is not connected to the external device, the sensor hub controls the switching element to switch to enable the metal mask to be floated.

In an embodiment, the electronic device further includes an RF unit. The RF unit is electrically connected to the sensor hub of the sensing control unit. When the connector is connected to the external device and the electronic device is in a video call mode, the sensor hub controls an output power of the RF unit to be reduced to a threshold.

In an embodiment, the electronic device further includes an image and sound capturing device. The image and sound capturing device is electrically connected to the sensing control unit. The sensing control unit determines that the electronic device is in the video call mode based on an image or sound captured by the image and sound capturing device.

In an embodiment, the electronic device further includes an RF unit. The RF unit is electrically connected to the sensor hub of the sensing control unit. When the connector is connected to the external device and the electronic device is in a data application mode, the sensor hub controls the output power of the RF unit to change periodically.

In an embodiment, the sensor hub controls a duty cycle of an output power of the RF unit to enable the output power of the RF unit to change periodically.

In conclusion, in the electronic device of the present invention, a sensing electrode for detecting whether a human body approaches is integrated with a metal mask of a connector. When the connector is not connected to an external device, a sensing control unit enables the metal mask of the connector to be floated, whereby the proximity sensing circuit may use the metal mask as the sensing electrode to detect a proximity state of a user, thus solving the problem of insufficient configuration space of the sensing electrode or influence on antenna performance in the traditional art. The sensing control unit adjusts an output power according to the proximity state, thereby falling within a power limit range specified by an SAR. When the connector is connected to the external device, the sensing control unit enables the metal mask of the connector to be grounded, so as to shield electromagnetic interference (EMI).

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION

Figure 1:
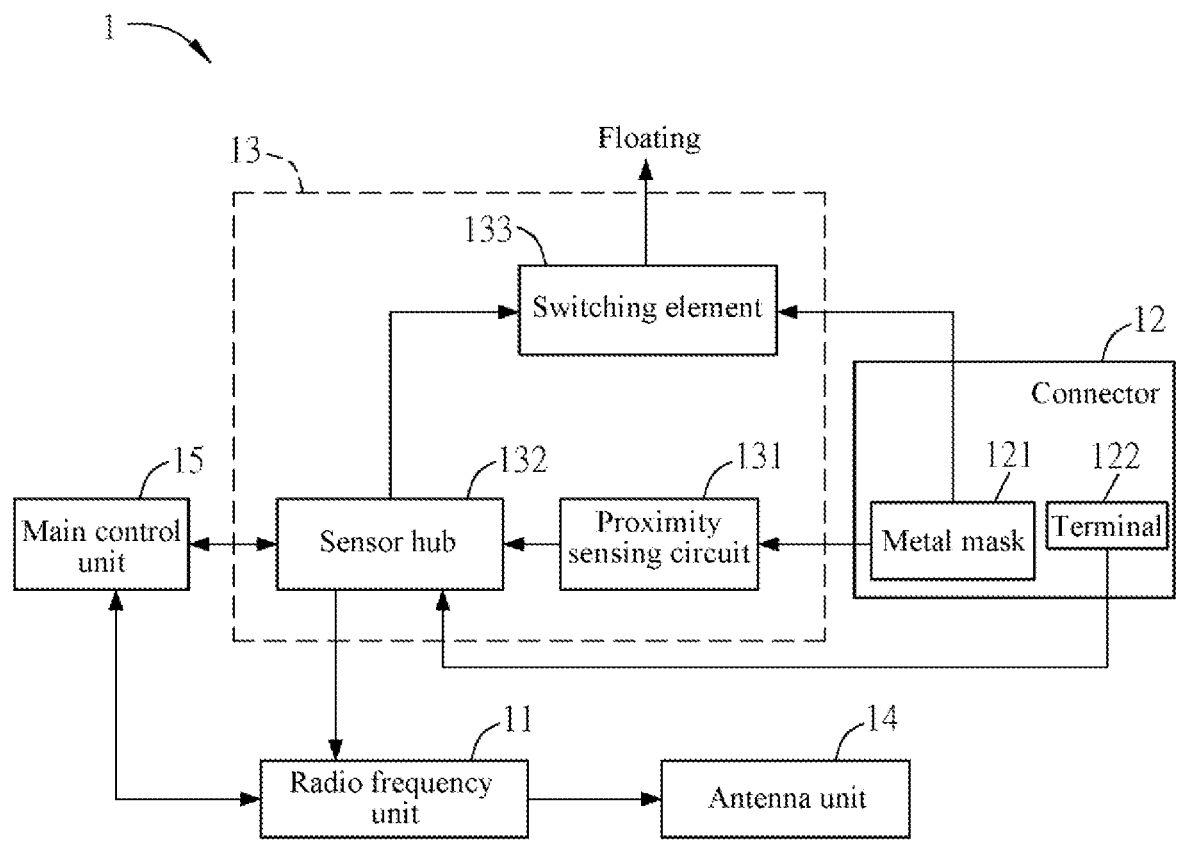
FIG. 1, FIG. 2, and FIG. 3 are functional block diagrams of an electronic device according to an embodiment of the present invention.

An electronic device according to an embodiment of the present invention will be described below with reference to related drawings in which the same elements will be illustrated with the same reference numerals. The elements present in the following embodiments are intended only to illustrate relative relationships thereof and do not represent true proportions or dimensions of the elements.

The electronic device of the following embodiments may be, for example, a mobile phone or a tablet computer.

Figure 2:
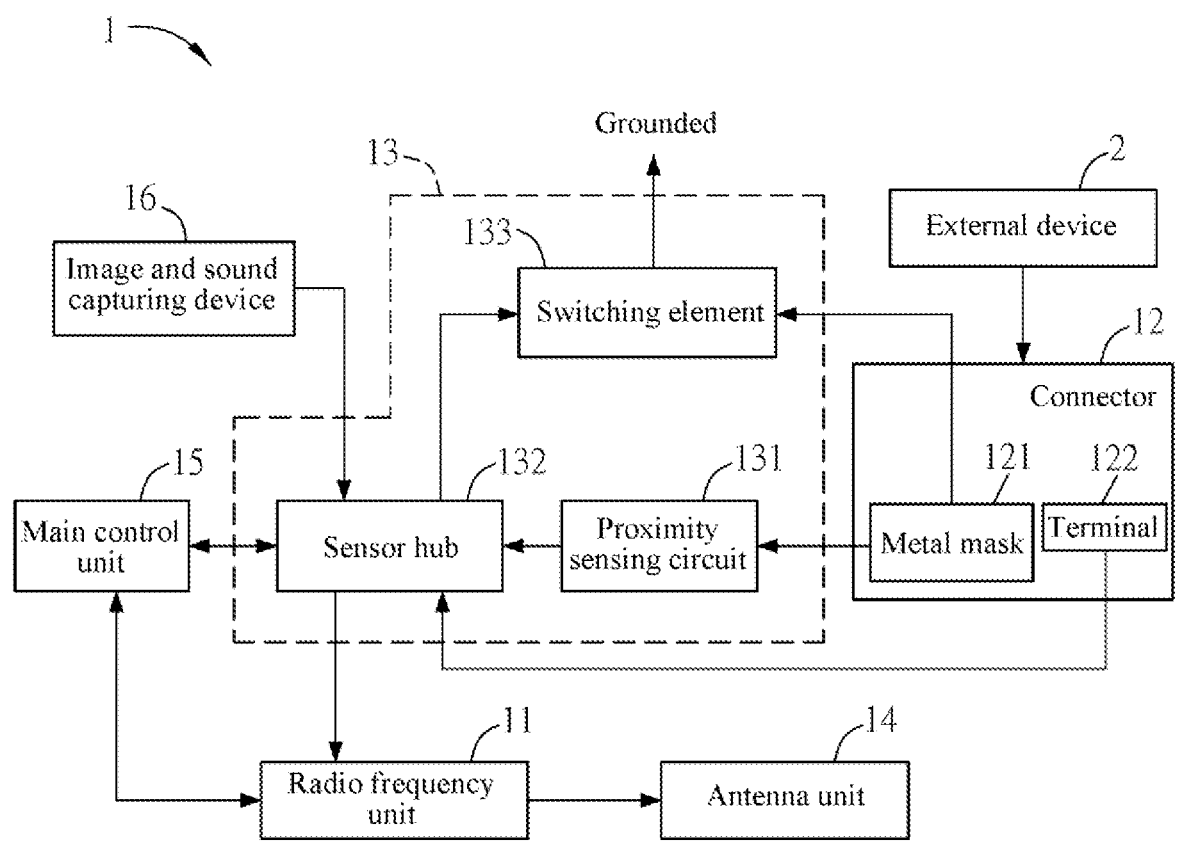
Figure 3:
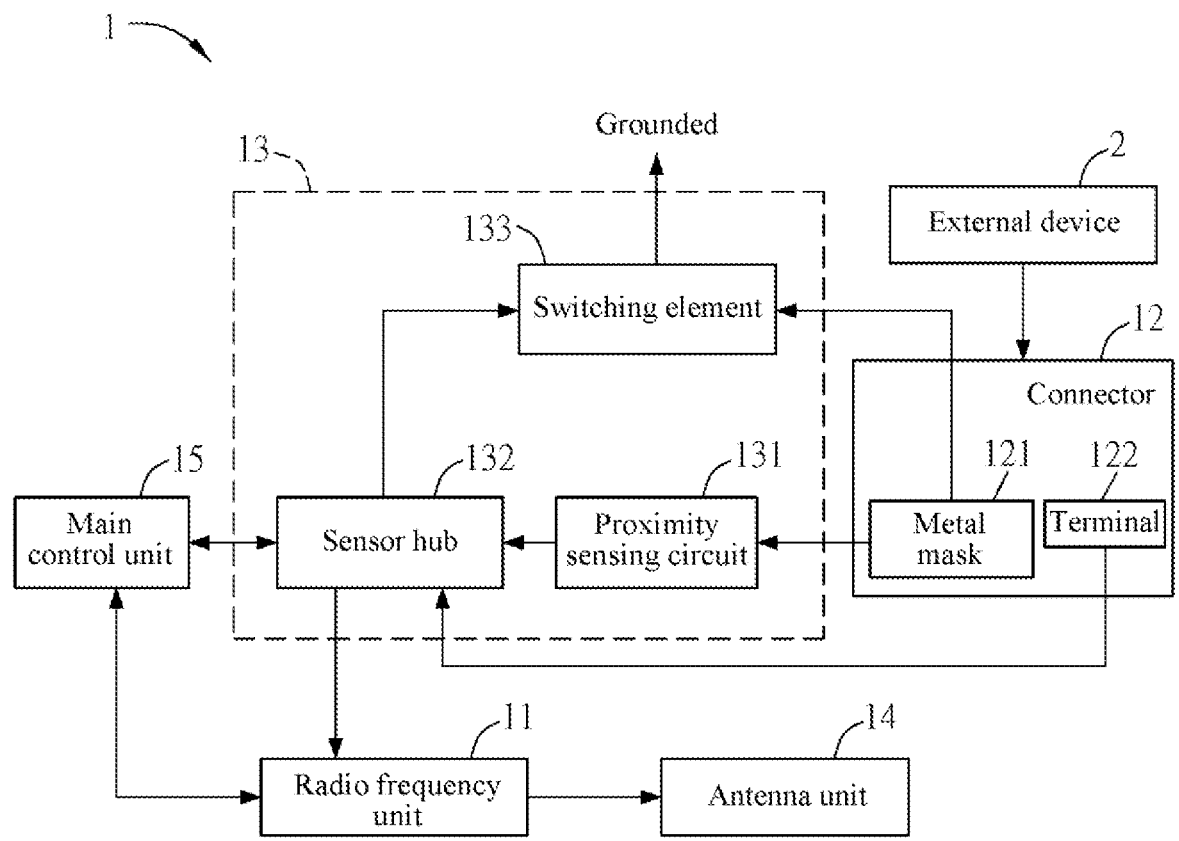
Figure 4A:
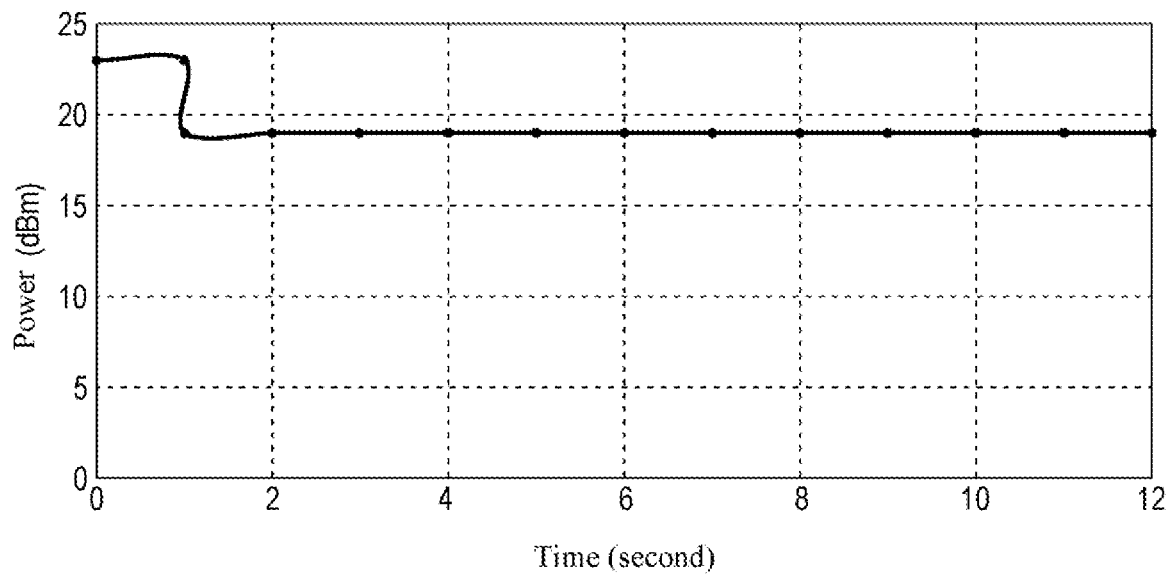
FIG. 4A is a schematic diagram of an embodiment of an output power of an RF unit in the electronic device of FIG. 1 and FIG. 2.
Figure 4B:
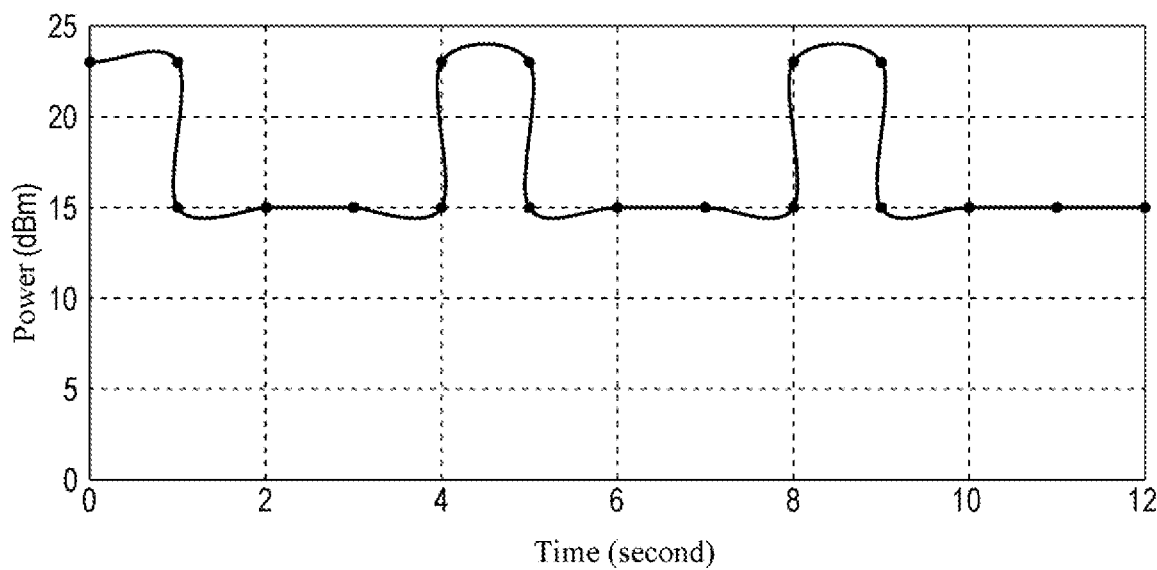
FIG. 4B is a schematic diagram of an embodiment of an output power of an RF unit in the electronic device of FIG. 3.

FIG. 1, FIG. 2, and FIG. 3 are functional block diagrams of an electronic device according to an embodiment of the present invention. FIG. 4A is a schematic diagram of an embodiment of an output power of an RF unit in the electronic device of FIG. 1 and FIG. 2. FIG. 4B is a schematic diagram of an embodiment of an output power of an RF unit in the electronic device of FIG. 3.

Referring to FIG. 1 to FIG. 3, an electronic device 1 includes a connector 12 and a sensing control unit 13. In addition, the electronic device 1 of this embodiment may further include an RF unit 11, an antenna unit 14, a main control unit 15, and an image and sound capturing device 16 (FIG. 2).

The RF unit 11 and the antenna unit 14 are disposed in cooperation and electrically connected. In some embodiments, the RF unit 11 may be a 4G or 5G Long Term Evolution (LTE) or 5G RF module. In some embodiments, the antenna unit 14 may be a 4G or 5G antenna. In addition, the main control unit 15 is electrically connected to the RF unit 11 and the sensing control unit 13. The main control unit 15 may include core control components of the electronic device 1, for example, at least one Central Processing Unit (CPU) and a memory, or other control hardware, software, or firmware.

The connector 12 is an interface between the electronic device 1 and another electronic device (for example, an external device 2 of FIG. 2), which may be, for example, a USB Type-A, Type-B, or Type-C connector. The connector 12 may include a metal mask 121 and at least one terminal 122. The metal mask 121 may be configured to shield EMI when grounded, and the terminal 122 may be located inside the metal mask 121. In some embodiments, the metal mask 121 may be a metal housing. The connector 12 of this embodiment is an example of a USB Type-C connector, and the terminal 122 may be, for example, but not limited to, CC1 or/and CC2 pins of the Type-C connector.

The sensing control unit 13 is electrically connected to the RF unit 11, the metal mask 121, and the terminal 122. The sensing control unit 13 is suitable for sensing whether the connector 12 is connected to an external device 2, and includes a proximity sensing circuit 131 connected to the metal mask 121. In addition, the sensing control unit 13 of this embodiment may further include a sensor hub 132 and a switching element 133. The sensor hub 132 is electrically connected to the RF unit 11, the proximity sensing circuit 131, the switching element 133, the connector 12, the main control unit 15, and the image and sound capturing device 16, and the sensor hub 132 may detect whether the connector 12 is connected to the external device 2 (as shown in FIG. 2 or FIG. 3) through the terminal 122 of the connector 12. Herein, the external device 2 is an electronic device that may be connected to the electronic device 1 through the connector 12. The external device 2 has another connector (not shown) corresponding to the connector 12. The sensor hub 132 may determine whether the connector 12 is connected to the external device 2 by checking a signal of the terminal 122 of the connector 12 (for example, CC1 and/or CC2 pins of the Type-C connector). In some embodiments, the sensor hub 132 may determine whether the connector 12 is connected to the external device 2 by detecting whether the terminal 122 of the connector 12 has a current.

In addition, the proximity sensing circuit 131 may be a circuit of a proximity sensor for sensing whether an object (for example, a human body) is proximal to the metal mask 121. When the human body is proximal to the metal mask 121, the proximity sensing circuit 131 may transmit a signal to the sensor hub 132 whereby the sensor hub 132 may perform corresponding control actions. In addition, the switching element 133 is electrically connected to the sensor hub 132 and the metal mask 121. The metal mask 121 may be grounded (namely, connected to a ground terminal, referring to FIG. 2 or FIG. 3) or floated (namely, suspending, referring to FIG. 1) through a switching action of the switching element 133. In some embodiments, the proximity sensing circuit 131, the sensor hub 132, and the switching element 133 may each be an integrated circuit (IC).

When the connector 12 is not connected to the external device 2, the sensing control unit 13 may enable the metal mask 121 to be floated, and the floated metal mask 121 is suitable as a sensing electrode of the proximity sensing circuit 131. In other words, the proximity sensing circuit 131 detect a proximity state of an object (for example, a user) via the floated metal mask 121. The proximity state is, for example, detecting whether the body of the user is proximal to the metal mask 121, and the sensing control unit 13 may adjust an output power of the RF unit 11 according to the proximity state. The sensing principle of the metal mask 121 as the sensing electrode of the proximity sensing circuit 131 is, for example, the sensing principle of a capacitive proximity sensor. The proximity state of the user may be determined by changing an oscillation frequency of the proximity sensing circuit 131 caused by the proximity of the user to the sensing electrode.

More specifically, in the embodiment of FIG. 1, when the connector 12 is not connected to the external device 2 (not shown in FIG. 1), the sensor hub 132 may control the switching element 133 to switch to enable the metal mask 121 to be floated (namely, in a suspending state), thereby enabling the floated metal mask 121 to be a sensing electrode that cooperates with the proximity sensing circuit 131 to detect the proximity of the human body, and sensing whether the user is proximal to the metal mask 121 accordingly. If the user is proximal to the metal mask 121 (for example, within 1 cm), the sensor hub 132 of the sensing control unit 13 may control the output power of the RF unit 11 to be reduced to a threshold. The threshold is lower than the power limit range specified by the SAR to meet regulatory requirements. The power reduction herein may be referred to as fixed Dynamic Power Reduction (DPR). For example, as shown in FIG. 4A, the power may be reduced from the original 23 dBm to, for example, 19 dBm.

In addition, when the connector 12 is connected to the external device 2, the sensor hub 132 may control the switching element 133 to switch to enable the metal mask 121 is grounded, so as to shield EMI through the metal mask 121. This situation may be divided into two usage scenarios. The first usage scenario, as shown in the embodiment of FIG. 2, is a video call mode, which may activate the image and sound capturing device 16 (such as a camera or/and a microphone) to capture an image or/and a sound. The second usage scenario, as shown in the embodiment of FIG. 3, is a data application mode, in which the image and sound capturing device 16 is in an off state (not shown in FIG. 3), so as to transmit data with the external device 2 through the connector 12. Therefore, the sensing control unit 13 may determine whether the electronic device 1 is in the video call mode or the data application mode by whether or not the image and sound capturing device 16 captures an image or a sound. The embodiments of FIG. 2 and FIG. 3 are described in detail below.

In the embodiment of FIG. 2, when the connector 12 is connected to the external device 2 and the electronic device 1 is in the video call mode, stable and robust wireless network connection quality is required during the video call to ensure the continuity of image and/or sound transmission, whereby the user does not feel delay, and the specification of SAR values is required to be met. Therefore, the sensor hub 132 may control the switching element 133 to switch to enable the metal mask 121 is grounded, and the sensor hub 132 may control the output power of the RF unit 11 to be reduced to a threshold, so as to ensure continuous and stable transmission. The threshold also needs to be lower than the power limit range specified by the SAR, so as to meet the regulatory requirements. The power reduction herein may be referred to as fixed DPR. As shown in FIG. 4A, the power may be reduced from the original 23 dBm to, for example, 19 dBm.

In addition, in the embodiment of FIG. 3, when the connector 12 is connected to the external device 2 and the electronic device 1 is in the data application mode, the image and sound capturing device 16 is turned off. In this case, data may be transmitted with the external device 2 through the connector 12. If the output power of the RF unit 11 is higher than the power limit specified by the SAR, it is not necessary to reduce the power all the time, the function of power reduction may be implemented (DPR ON) for certain periods of time, and the function of power reduction may not be implemented (DPR OFF) for certain periods of time. The regulatory requirements may be met so long as an average power is maintained within the power limit range specified by the SAR. In this mode, the sensor hub 132 may control the switching element 133 to switch to enable the metal mask 121 is grounded, and the sensor hub 132 may control the power output of the RF unit 11 to change periodically. In order to achieve the periodic change function, the sensor hub 132 may periodically change the output power of the RF unit 11 by controlling a duty cycle of the output power of the RF unit 11, that is, by a fixed duty cycle. For example, as shown in FIG. 4B, the power of 23 dBm lasts for 3 seconds, the power of 15 dBm lasts for 1 second, the power of 23 dBm lasts for 3 seconds, and the power of 15 dBm lasts for 1 second, etc. (duty cycle is 25%). The average power may still be maintained within the power limit range specified by the SAR (for example, 19 dBm). The power reduction herein is referred to as periodical DPR.

In conclusion, in the electronic device of the present invention, a sensing electrode for detecting whether a human body approaches is integrated with a metal mask of a connector. When the connector is not connected to an external device, a sensing control unit enables the metal mask of the connector to be floated, whereby the proximity sensing circuit may use the metal mask as the sensing electrode to detect a proximity state of a user, thus solving the problem of insufficient configuration space of the sensing electrode or influence on antenna performance in the traditional art. The sensing control unit adjusts an output power according to the proximity state, thereby falling within a power limit range specified by an SAR. When the connector is connected to the external device, the sensing control unit enables the metal mask of the connector to be grounded, so as to shield EMI.

The foregoing is given by way of example only and not by way of limitation. Any equivalent modification or alteration made without departing from the spirit and scope of the present invention should be included in the scope of the appended patent application.

What is claimed is:

1. An electronic device, comprising:
a connector, comprising a metal mask and at least one terminal; and
a sensing control unit, electrically connected to the metal mask and the at least one terminal, the sensing control unit being suitable for sensing whether the connector is connected to an external device, and comprising a proximity sensing circuit connected to the metal mask, wherein when the connector is connected to the external device, the sensing control unit enables the metal mask to be grounded; and when the connector is not connected to the external device, the sensing control unit enables the metal mask to be floated, and the floated metal mask is suitable as a sensing electrode of the proximity sensing circuit.

2. The electronic device according to claim 1, wherein the connector is a Universal Serial Bus (USB) Type-A, Type-B, or Type-C connector.

3. The electronic device according to claim 1, further comprising a Radio Frequency (RF) unit, the RF unit being electrically connected to the sensing control unit, wherein the proximity sensing circuit detects a proximity state of an object via the floated metal mask, and the sensing control unit adjusts an output power of the RF unit according to the proximity state.

4. The electronic device according to claim 3, wherein when the proximity sensing circuit detects proximity of the object via the floated metal mask, the sensing control unit controls the output power of the RF unit to be reduced to a threshold.

5. The electronic device according to claim 1, wherein the sensing control unit further comprises a sensor hub, the sensor hub is electrically connected to the terminal, and the sensor hub detects, through the terminal, whether the connector is connected to the external device.

6. The electronic device according to claim 5, wherein the sensing control unit further comprises a switching element, and the switching element is electrically connected to the sensor hub and the metal mask; when the connector is connected to the external device, the sensor hub controls the switching element to switch to enable the metal mask to be grounded; and when the connector is not connected to the external device, the sensor hub controls the switching element to switch to enable the metal mask to be floated.

7. The electronic device according to claim 5, further comprising an RF unit, the RF unit being electrically connected to the sensor hub of the sensing control unit, wherein when the connector is connected to the external device and the electronic device is in a video call mode, the sensor hub controls an output power of the RF unit to be reduced to a threshold.

8. The electronic device according to claim 7, further comprising:

an image and sound capturing device, electrically connected to the sensing control unit, wherein the sensing control unit determines that the electronic device is in the video call mode based on an image or sound captured by the image and sound capturing device.

9. The electronic device according to claim 5, further comprising an RF unit, the RF unit being electrically connected to the sensor hub of the sensing control unit, wherein when the connector is connected to the external device and the electronic device is in a data application mode, the sensor hub controls the output power of the RF unit to change periodically.

10. The electronic device according to claim 9, wherein the sensor hub controls a duty cycle of the output power of the RF unit to enable the output power of the RF unit to change periodically.

* * * * *